United States Patent
Werkheiser et al.

(10) Patent No.: US 11,634,983 B2
(45) Date of Patent: Apr. 25, 2023

(54) WIRELESS TELEMETRY USING TOOL BODY DEFLECTION FOR OPENING A TOE SLEEVE

(71) Applicant: Halliburton Energy Services, Inc., Houston, TX (US)

(72) Inventors: Gregory Thomas Werkheiser, Carrollton, TX (US); Michael Linely Fripp, Carrollton, TX (US); Zachary William Walton, Edmond, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 294 days.

(21) Appl. No.: 16/885,778

(22) Filed: May 28, 2020

(65) Prior Publication Data

US 2021/0372277 A1  Dec. 2, 2021

(51) Int. Cl.
*E21B 47/18* (2012.01)
*E21B 47/007* (2012.01)
*E21B 34/06* (2006.01)
*G01L 1/22* (2006.01)
*G01L 9/00* (2006.01)

(52) U.S. Cl.
CPC ............. *E21B 47/18* (2013.01); *E21B 34/06* (2013.01); *E21B 47/007* (2020.05); *G01L 1/2262* (2013.01); *G01L 1/2287* (2013.01); *G01L 9/0027* (2013.01); *E21B 2200/06* (2020.05)

(58) Field of Classification Search
CPC ........ E21B 47/18; E21B 47/007; E21B 47/16; E21B 47/12; E21B 47/06; E21B 47/138; E21B 34/06; E21B 34/14; E21B 17/00; E21B 17/10; E21B 2200/06; G01L 9/0027; G01L 1/2262; G01L 1/2287; G01V 8/16; G01B 11/16; B65G 5/00
See application file for complete search history.

(56) References Cited

U.S. PATENT DOCUMENTS 5,337,234 A * 8/1994 Anderson ............... E21B 47/00
 702/6
5,579,283 A * 11/1996 Owens .................. E21B 34/066
 175/48

(Continued)

FOREIGN PATENT DOCUMENTS

EP 0697500 B1 10/2002

OTHER PUBLICATIONS

International Search Report and Written Opinion for PCT application No. PCT/US2020/034857 dated Feb. 24, 2021, 9 pages.

*Primary Examiner* — George S Gray
(74) *Attorney, Agent, or Firm* — Kilpatrick Townsend & Stockton LLP

(57) ABSTRACT

Systems and methods for wireless telemetry in oil and gas wells use fluid pressure differentials to send signals from surface equipment to a downhole tool. More specifically, the methods and systems selectively apply fluid pressure to a tubing string and measure the resulting mechanical strain, or deformation, on a tubular of the downhole tool. The deformation may be an elastic deformation or it may be a plastic deformation with yielding of the tubular. One or more of such strains or deformations may be used to encode a digital signal that can command an action on the tool. The strain or deformation may be measured by a low-cost strain gauge.

16 Claims, 5 Drawing Sheets

(56) References Cited

U.S. PATENT DOCUMENTS

| | | | | |
|---|---|---|---|---|
| 6,021,095 A | * | 2/2000 | Tubel | E21B 47/20 |
| | | | | 166/166 |
| 6,414,905 B1 | * | 7/2002 | Owens | E21B 33/1295 |
| | | | | 367/133 |
| 6,714,138 B1 | * | 3/2004 | Turner | E21B 47/20 |
| | | | | 340/856.4 |
| 2004/0045351 A1 | * | 3/2004 | Skinner | E21B 47/007 |
| | | | | 73/152.48 |
| 2010/0219334 A1 | | 9/2010 | Legrand et al. | |
| 2011/0054808 A1 | | 3/2011 | Pearce et al. | |
| 2012/0199400 A1 | | 8/2012 | Boulet et al. | |
| 2014/0083689 A1 | * | 3/2014 | Streich | E21B 34/102 |
| | | | | 166/250.15 |
| 2016/0230505 A1 | * | 8/2016 | Garcia | E21B 34/10 |
| 2017/0306755 A1 | * | 10/2017 | Barak | E21B 34/06 |
| 2019/0136674 A1 | * | 5/2019 | Fripp | E21B 43/12 |

* cited by examiner

WIRELESS TELEMETRY USING TOOL BODY DEFLECTION FOR OPENING A TOE SLEEVE

TECHNICAL FIELD

Embodiments of the present disclosure relate generally to downhole telemetry in oil and gas wells, and particularly to methods and systems for wirelessly communicating command signals to operate downhole tools in unconventional completions.

BACKGROUND

Downhole tools are used for many applications in oil and gas wells. Several telemetry techniques exist for communicating with these tools from the surface of the well, for example, to provide command signals to activate the tools at the precise time selected by the operators on site. One technique involves wirelessly communicating with the downhole tools by sending pressure pulses through the wellbore fluids. The pressure pulses are generally detected by downhole pressure transducers on the tools and converted into digital signals that can then be supplied to electronics or processors that control operation of the downhole tools. Wired communication techniques are also known in the art.

While downhole telemetry using conventional pressure transducers may offer adequate functionality in many applications, the pressure transducers tend to be expensive, require holes in the tubular to allow pressure communication, and often need significant amounts of electrical power to operate. The high cost of pressure transducers in particular can be problematic because operating margins on many oil and gas wells are often extremely low, especially on unconventional plays that require horizontal drilling of wellbores and subterranean fracturing of production zones.

Thus, a need exists for improved methods of downhole telemetry that deliver reliable performance without expensive or power-hungry components like pressure transducers, sensors, and repeaters.

BRIEF DESCRIPTION OF THE DRAWINGS

For a more complete understanding of the exemplary disclosed embodiments, and for further advantages thereof, reference is now made to the following description taken in conjunction with the accompanying drawings in which.

In the drawings, identical reference numerals have been used, where possible, to designate identical elements that are common to the figures. It should be noted that elements disclosed in one embodiment may be beneficially utilized on other embodiments without specific recitation.

DESCRIPTION OF EXEMPLARY EMBODIMENTS

The following discussion is presented to enable a person skilled in the art to make and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. Accordingly, the disclosed embodiments are not intended to be limited to the particular embodiments shown, but are to be accorded the widest scope consistent with the principles and features disclosed herein.

At a high level, the embodiments disclosed herein relate to improved wireless methods and systems for providing telemetry in downhole well drilling operations. The methods and systems provide telemetry by selectively applying fluid pressure to a tubing string and measuring the resulting mechanical strain, or deformation, on a tubular of the downhole tool. The deformation may be an elastic deformation or it may be a plastic deformation with yielding of the tubular. One or more of such strains or deformations may be used to encode a digital signal that can command an action on the tool. In some embodiments, the strain or deformation may be measured by a low-cost strain gauge. The strain gauge may be a resistance foil type strain gauge in which the degree strain is measured using a Whetstone bridge. Suitable strain gauges useful in embodiments of the present disclosure typically cost only a small fraction of the cost of pressure transducers. Further, a strain measurement requires no holes be formed in the tubing or pressure housing, whereas a pressure transducer must have a pressure connection to the tubing pressure.

Embodiments of the present disclosure accordingly use measurements of mechanical deflection rather than actual fluid pressure to communicate with downhole tools, such as fracturing sleeves and other types of oilfield tubular based equipment. In particular, a strain gauge may be used in a system for controlling hydraulic fracturing operations in a wellbore to provide control signals, for example, that open a toe sleeve to permit fracturing fluids to flow from the mandrel in the toe sleeve into the formation.

Figure 1:
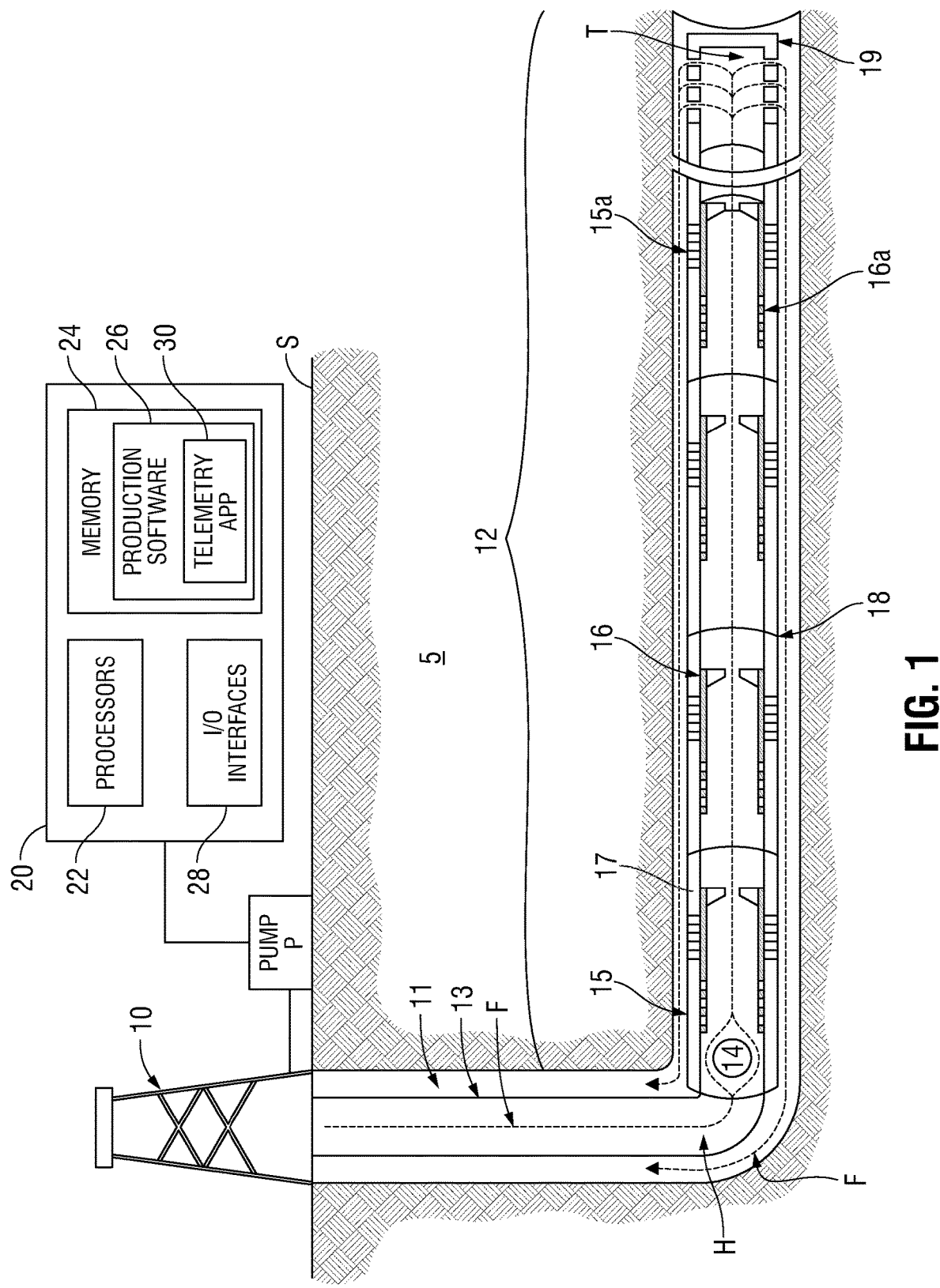
FIG. 1 is a schematic diagram showing a telemetry system for an oil and gas well according to embodiments of the disclosure.

Referring now to FIG. 1, an exemplary well 10 may include a production tubing string 11 that extends down a wellbore in a subterranean formation 5 below the surface "S." In the production string 11, a series of connected tubulars 13 may be placed to allow for drilling, fracturing, and other well operations known to those skilled in the art. Fluids F (dashed line), such as hydraulic fracturing fluids, or treatment fluids, may be pumped into the production string 11 by pump "P," which are returned through an annulus (not expressly labeled) in the wellbore and back to the surface S. Although not expressly shown, other common well elements known to those skilled in the art, such as casings, cement, packers, and the like may also be present in the wellbore.

Hydraulic fracturing is often performed in a substantially horizontal portion 12 of the well. The horizontal portion 12 comprises a constructed lateral wellbore section having one or more fracturing or frac sleeves 15 installed along the lateral wellbore section. Hydraulic fracturing treatment may be performed along the horizontal well portion 12 to stimulate production of hydrocarbons along that portion. The part of the horizontal portion 12 of the well that is adjacent to the vertical portion of the well is called the heel "H" and the other end of the horizontal portion is called the toe "T." In between the heel "H" and the toe "T" may be located multiple fracturing sleeves 15.

An exemplary fracturing sleeve 15 may be comprised of a fixed outer housing 17 (or mandrel) and a sliding inner sleeve 16. The fixed outer housing 17 helps support axial loads on the fracturing sleeve 15. As known to those skilled in the art, conventional fracturing sleeves may use a combination of graduated balls 14 and baffle sizes to allow the individual inner sleeves 16 to shift to an "open" position and allow fluid to flow from the fracturing sleeves 15 into the formation 5. In the open position, openings 16a in each sleeve 16 align with openings 15a in a respective fracturing sleeve 15 to allow fluid to flow from the string 13 into the wellbore.

Fracturing sleeves 15 may also be opened with a downhole timer incorporated into the sleeve, rather than a ball and baffle arrangement. One example is the RapidStart® Initiator CT timer operated sleeve system from Halliburton Energy Services, Inc., which includes Halliburton's programmable Elect® toe sleeve. The Elect® toe sleeve operates as a piece of casing in the wellbore until the programmed amount of time has elapsed. Once the pre-programmed time has elapsed, the sleeve will open automatically when a predetermined pressure is achieved.

While timed opening allows many advantages, it may be desirable in many operations to have a reliable yet low-cost method for commanding a fracturing sleeve to open as needed. For example, it may be desirable in certain operations to open the fracturing sleeve prior to the timer reaching its full count.

Accordingly, embodiments of the present disclosure provide systems and methods for implementing reliable yet low-cost wireless communications with a downhole tool like a fracturing sleeve. The methods and systems allow control equipment 20 at the surface to communicate with a downhole tool by selectively applying fluid pressure in the string 11 and measuring the relative strain on the downhole tool. The control equipment 20 may selectively apply pressure by controlling the fluid pressure in the string 11 using the pump P. In a fracturing sleeve, for example, when the sleeve is in a closed position, a pressure differential may be created between the pressure in the string 11 and the pressure in the wellbore to produce the strain. A series or pattern of applied strain may be used to encode a digital signal that may be used to command an action on the sleeve (or other downhole tools).

In the FIG. 1 example, the control equipment 20 may include known components such as one or more computer processors 22, memory 24, software 26 stored thereon, and input/output (I/O) interfaces 28. Software 26 may be production control software that includes a well telemetry application 30 therein, among other applications. In general, the I/O interfaces 28 allow control equipment 20 to interface with other computing components (not expressly shown), such as printers, displays, wired and/or wireless networks, and the like. According to known techniques, the I/O interfaces 28 also allow control equipment 20 to operate electronically-controlled pumps (e.g., pump P), valves, and other production components (not expressly shown) useful to control production at the well 10. Similarly, control equipment 20 may also be adapted to receive input from instrumentation and measuring devices, like pressure gauges and thermometers, and to record various operating parameters at the well, such as production temperatures, pressures, flow rates, and other measurements. This allows control equipment 20 to conduct closed-loop control of the well 10, for example, by issuing a command to a downhole tool like a fracturing sleeve using mechanical strain-based telemetry.

At the downhole tool, a number of techniques exists for detecting the strain or deformation on the fracturing sleeve caused by selective application of fluid pressure. A strain gauge, for example, may be installed down hole to detect the deformation on the downhole tool resulting from fluid pressure changes applied by the control equipment 20. Pressure applied to the tool body (or any tubular of a downhole tool) will cause a deformation on the tool body that can be measured and thus used to encode a digital command. This deformation measurement advantageously requires no holes in the fracturing sleeve or other pressure housing.

Figure 2A:
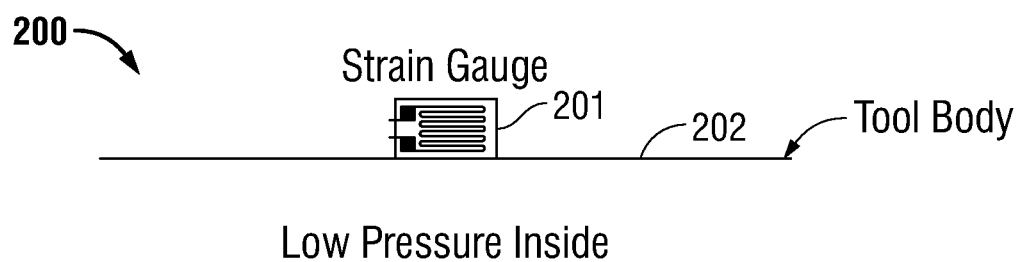
FIGS. 2A-2B are schematic diagrams showing a tool body equipped with a strain gauge mounted thereon according to embodiments of the disclosure.
Figure 2B:
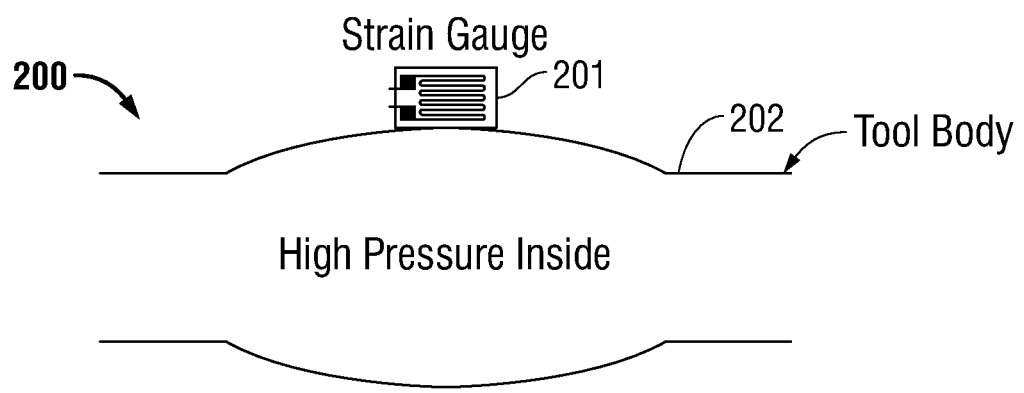

Referring now to FIGS. 2A and 2B, in some embodiments, a strain gauge 201 or other strain sensor is placed on a downhole tool 200 (such as a fracturing sleeve), specifically a tool body 202 thereof, to measure the deformation within the tool body 202. In some embodiments, the strain gauge 201 is welded directly to the tool body 202 or attached by epoxy or other suitable adhesive compound. Changes made to the fluid pressure in the production string by the control equipment 20 induces mechanical stress in the downhole tool body 202. The precise timing and magnitude of the changes in pressure may be achieved by controlling the fluid pumped into the tool body 202 and may be performed by the control equipment 20 (e.g., the telemetry application 30 therein) in a manner to encode telemetry commands to the downhole tool 200. These deformations are, in turn, measured by the strain gauge 201 on the downhole tool 200 and may then be processed by the on-board electronics of the tool to decode the telemetry signal.

When the fluid pressure is low inside the tool body 202 relative to the fluid pressure in the wellbore, then there will be little deformation measured by strain gauge 201. This scenario is depicted in FIG. 2A. Conversely, when the fluid pressure is high inside the tool body 202 relative to the fluid pressure in the wellbore, the tool body 202 will tend to expand radially as shown in FIG. 2B, and the tool body 202 will experience increased mechanical stress, which may be measured by the strain gauge 201. By increasing or decreasing internal fluid pressure as discussed, the deformation in the tool body 202 of the tool 200 will increase or decrease accordingly. The output of the strain gauge 201 may then be used to determine what command is being send from the control equipment 20.

Figure 3:
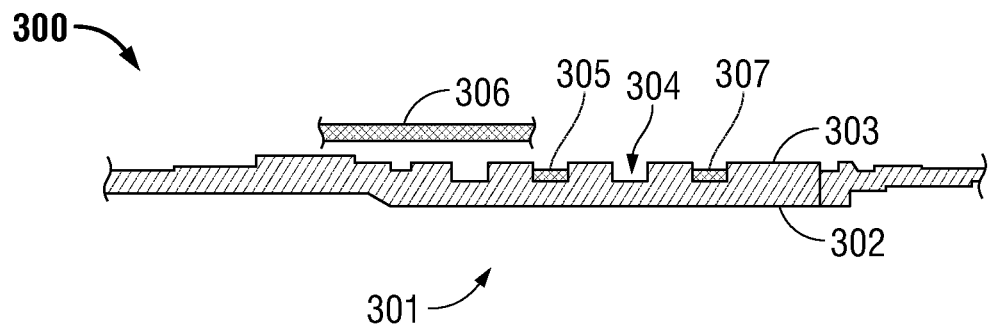
FIG. 3 is a partial cross-sectional view of a fracturing sleeve with a strain gauge mounted thereon according to embodiments of the disclosure.
Figure 3:
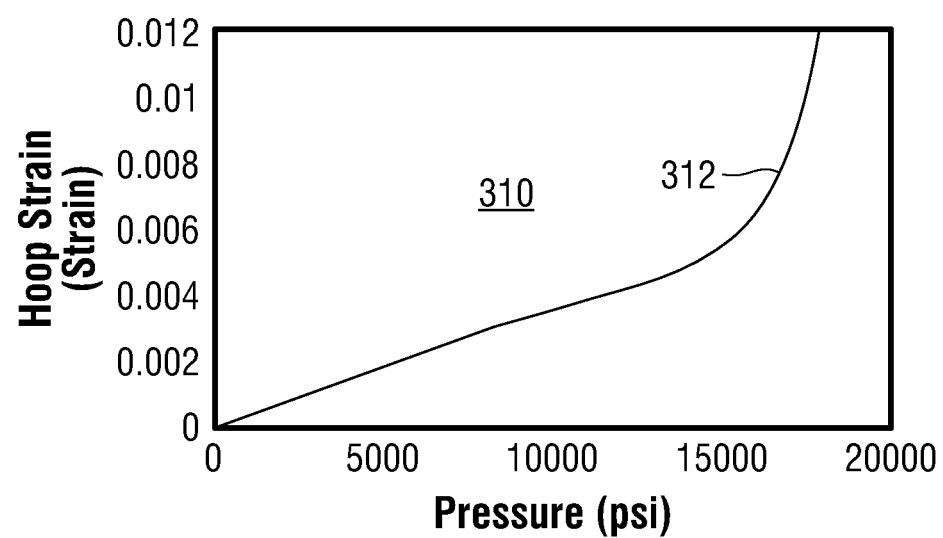

FIG. 3 shows an embodiment that may be used for hydraulic fracturing operations in which a strain sensor may be arranged on the mandrel of a toe sleeve. In the figure, a partial cross-sectional view of a mandrel 301 for a toe sleeve 300 can be seen. Mandrels in general are designed, among other things, to support axial loads within a downhole tool. The mandrel 301 has an inner surface 302 with an inner diameter and an outer surface 303 with an outer diameter. The outer surface is the surface that faces the wellbore. A series of grooves 304 are arranged on the outer surface 303 of mandrel 301 to engage with other components (not shown) of the toe sleeve 300.

In accordance with embodiments of the disclosure, a strain gauge 305 may be provided in one of grooves 304 to measure deformation on the mandrel 301. The strain gauge 305 may be electrically connected to electronics 307, such as a processor and attendant components, also arranged on the tool 300. The electronics 307 are adapted to receive and process signals from the strain gauge 305 to extract any commands contained or otherwise encoded in the signals according to a known encoding scheme. The electronics 307 thereafter cause the tool 300 to perform one or more actions as indicated by any commands contained in the signals from the strain gauge 305.

In some embodiments, a protective cover 306 may be secured to the mandrel 301 to protect the strain gauge 305 and the electronics 307 thereon when the toe sleeve 300 is run into the wellbore. The protective cover 306 prevents exposure of the strain gauge 305 and the electronics 307 to conditions in the wellbore. In the embodiment shown, strain gauge 305 is arranged radially around mandrel 301 to measure hoop strain caused by the pressure inside the sleeve 300. In other embodiments, the strain gauge 305 may be arranged longitudinally on the mandrel 301, either separately or in conjunction with a radially mounted strain gauge 305.

In embodiments where two or more of strain gauges are advantageously provided on the downhole tool, at least two of the strain gauges may be oriented substantially orthogonally to each other, one being arranged substantially radially and the other being arranged substantially axially on the tool. This orthogonal arrangement allows any temperature related deformations detected by the strain gauges to cancel out in determining the encoded signal. Typically, when the deformation is the result of pressure differentials caused by increases or decreases in the fluid pressure in the tool, the deformation measurements from orthogonally arranged gauges will reflect deformations in opposite directions. For example, a radial gauge would measure an increase in deformation while an axial gauge would measure a decrease. On the other hand, when the deformation is the result of thermal expansion, both gauges will measure an increase in deformation.

The ability to command a toe sleeve (or other downhole tools) to open using pressure-based signals that can be differentiated from background hydrostatic pressure in the wellbore provides further advantageous methods in pressure testing wellbore casing. Generally, wellbore casing is pressure tested to a rated capacity before the casing is used in a fracturing operation. This testing requires increasing the fluid pressure in the wellbore to some predetermined maximum expected level that the casing is designed to withstand. After testing, in order to cause conventional ball-and-baffle fracturing sleeves to slide through the casing, the pressure in the fracturing sleeve must be increased over this maximum level to shear connecting pins and release the sleeve. Increasing the pressure in the tool to such a level is generally undesirable. In embodiments of the invention, however, the sleeve may be released using downhole electronics that are responsive to a command transmitted using pressure pulses that create deformations, but which are lower in absolute value than the rated pressure capacity of the wellbore casing.

Referring still to FIG. 3, a graph 310 depicting a finite element analysis ("FEA") is shown that corresponds to the stress on the mandrel 301 as the differential fluid pressure inside the toe sleeve 300 is increased from 0 to approximately 19,000 psi. In this example, the hoop strain, represented by line 312, initially increases at a roughly constant rate along with the pressure differential. The hoop strain, however, increases at a much sharper rate from about 15,000 psi to 19,000 psi. as pressure is applied to the interior of the tubular. At around 5500 psi applied internal pressure, the hoop strain is 2000 microstrain, which is large enough to be readily measured with a low-cost resistive strain gauge.

In some embodiments, a filter may be applied to the deformation measurements. For example, a low-pass filter may be applied in one embodiment to minimize electrical noise. In another embodiment, a high-pass filter may be applied to minimize the effects of hydrostatic pressure, which will tend to be very low frequency. In another embodiment, an adaptive digital filter is used to minimize the sensitivity to electrical noise as well as hydrostatic pressure.

According to various embodiments, multiple methods may be used for encoding a message using the deformations in a manner that would allow relatively simple decoding of the message by the electronics on the downhole tool. In one embodiment, the message may be encoded such that the electronics on the downhole tool may decode the message by comparing the deformation to a fixed threshold value. If the measured value goes above a threshold value, then the deformation is considered to be a "1", and if the measured value is below the threshold value, the deformation is considered to be a "0". This approach can also be used for encoding with pulse positioning where the time between threshold changes is used to encode digital information.

In another embodiment, the threshold deformation value is not a fixed value, but is instead adjusted based on the strain sensor readings over a predefined time interval (i.e., a time-averaged deformation value). This adjustability allows for the digital command to be encoded in the changes to the deformation values rather than in the absolute deformation value, which is particularly advantageous for reducing any signal noise in the deformation measurements that may have been induced by temperature changes, changes in hydrostatic pressure, or by changes in the mechanical behavior of the downhole tool.

In various embodiments, the adaptive threshold may be a fixed value above the time-averaged deformation, or it may be a value that is a function of the noise in the deformation measurements that is added to the time-averaged deformation. As an example, the tool may be run into the wellbore and then allowed to remain at particular downhole conditions for 2 hours or until the threshold deformation has reached an equilibrium value relative to the hydrostatic pressure. With reference again to FIG. 3, for example, the threshold deformation value may be set at approximately 2000 microstrain above the hydrostatic deformation value by maintaining tubular pressure at about 5500 psi. The operator next increases pressure in the tubular to 6000 psi, holds the pressure for 2 minutes, releases the pressure for 2 minutes, and then pressures back up to 6000 psi and holds for 2 minutes. The 6000 psi is larger than the 5500 psi that created the 2000 microstrain. As a result, each pressure cycle to 6000 psi will cause a deformation that is larger than the 2000 microstrain threshold. This send a simple signal to the tool that would tell it to start some process, such as opening the sleeve.

In various embodiments, a digital signal (e.g., 0/1, On/Off, Start/Stop, etc.) is encoded with a ramp-and-hold pressure profile (e.g., via control equipment 20). Again, with reference to FIG. 3, the tubular pressure is increased for a specific period of time. The pressure increase is held between a minimum and a maximum period of time, say, for at least 1 minute and no longer than 3 minutes. In one example, the hydrostatic pressure is 5,000 psi. The pressure is increased by 2,000 psi to 7,000 psi for 2 minutes (which is longer than 1 minute but less than 3 minutes). The pressure is decreased to 6,000 psi for an additional 2 minutes, where 6,000 psi is 1,000 psi over the hydrostatic pressure and is half of the initial pressure increase. In the ramp-and-hold encoding, the digital command is encoded by ramping the pressure to a fraction of the pressure change for time window and ramping the pressure decrease to a fraction of the previous pressure change.

In another embodiment, cycle count encoding may be used in which the digital command may be represented as a count of the number of strain cycles. The tool activates after a fixed number of strain cycles have been applied. Alternatively, time count encoding may be used in which the applied strain may be applied for a predetermined period of time. The length of time that the strain is applied is used to encode the digital command. For example, an applied strain that is applied for 30 seconds may be a "0" while an applied strain that is applied for 60 seconds may be a "1" and an applied strain that is applied for 120 seconds may be a "2," and so forth. In still further embodiment, time change encoding may be used in which, if the currently applied strain lasts the same length of time as the previous applied strain, then the strain represents a "0," while if the currently applied strain is 2 or 3 times longer or shorter in duration than the previous applied strain, then the strain represents a "1," and so on. It should be apparent that the signal can be comprised of multiple time lengths, such as a command composed of a 5 to 15 second applied strain followed by a 19 to 30 second applied strain followed by a 50 to 60 second applied strain, and so forth.

In yet a further embodiment, a digital signal to the downhole tool may be encoded using a combination of the count of strain cycles and time. In this case, the downhole tool may begin counting the number of strain cycles upon receiving a first signal from the surface (e.g., via control equipment 20). This count will continue to increment unless the applied strain exceeds a time limit. If it exceeds the time limit, then the count restarts. For example, the count increments if the applied strain exceeds the reference strain for at least 5 seconds and no longer than 60 seconds. If the applied strain exceeds the reference strain by 60 seconds or longer, then the count is reset to "0." And, in still a further embodiment, the signal may be encoded simply by the length of time that the strain is applied.

The strain sensor circuit could also be configured to auto-threshold to decrease processing complexity. This adaptive signal threshold method uses a threshold that adapts to system disturbances and outside noise. The method uses an algorithm that has an adaptation rate value, rate_slope, measured in seconds, and an offset value, rate_offset, measured in strain. The adaptation rate is the number of microstrain per seconds to shift values in strain, s_dif. The logic for the threshold, thresh, is as follows, where i is the current time increment, i−1 is the previous time increment, abs is the absolute value, and dt is the time increment in seconds:

```
if thresh(i-1) > (1.2*abs(sf_dif(i)) + rate_offset),
    thresh(i) = (1 - .1*dt/rate_slope)*thresh(i-1);
else
    thresh(i) = (1 + dt/rate_slope)*thresh(i-1);
end
```

Figure 4:
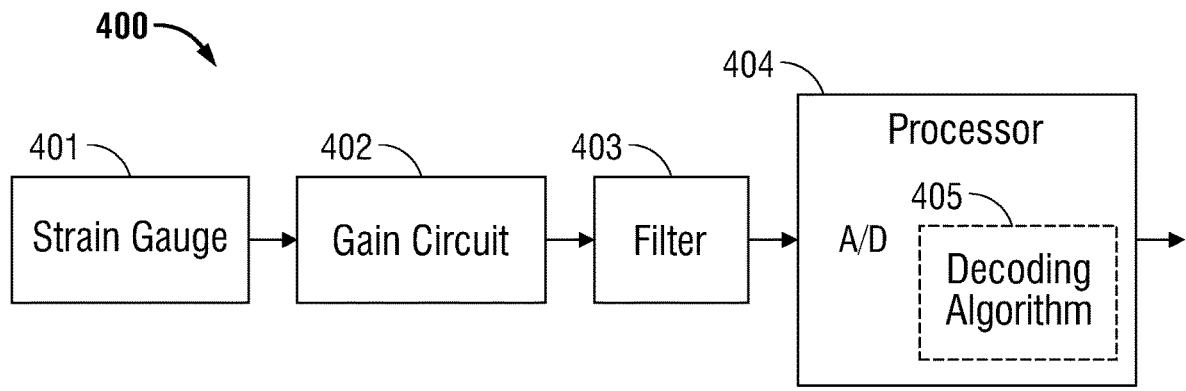
FIG. 4 is a circuit diagram for a strain sensor circuit according to embodiments of the disclosure.

With reference to FIG. 4, in some embodiments, the deformations that are sensed in connection with the encoded signals from the surface will have a higher frequency than the deformations caused by changes in the tubular pressure differential due to normal operations. In these embodiments, a high-pass filter may be used to filter out any deformations seen from relatively slow operations, such as routine changes to hydrostatic pressure associated with normal operations.

In FIG. 4, an exemplary strain sensor circuit 400 for a downhole tool is shown according to embodiments of the present disclosure. The strain sensor circuit 400 comprises a strain gauge 401 electrically coupled to a gain circuit 402, which is electrically coupled to a high-pass filter 403 that in turn is electrically coupled to a processor 404.

Gain circuit 402 receives and amplifies an analog signal generated by strain gauge 401. The analog signal represents a mechanical deformation on the downhole tool resulting from pressure differentials on the tool. The pressure differentials in turn are created by changing the fluid pressure in a certain series or sequence to encode a message to the downhole tool. The series or sequence of changes in fluid pressure may be made manually operation of the pump P by an operator, or they may be made by the control equipment 20, either automatically or by manual operation thereof. The amplified signal is then passed to the high-pass filter 403, which filters out any signal variations below a certain frequency, such as those resulting from routine changes to hydrostatic pressure.

The filtered signal from the filter 403 is then provided to the processor 404, which may be part of the on-board electronics discussed earlier that operates the tool. The processor 404 executes, among other programming, a decoding algorithm 405 (or the computer-readable instructions therefor) that extracts the message encoded in the filtered signal according to a preset encoding scheme. The particular decoding algorithm 405 executed by the processor 404 may be selected (e.g., installed, downloaded, etc.) as needed for a particular application and may include any one or more of the encoding schemes mentioned above.

It should be noted in the foregoing that the gain circuit 402 and the high-pass filter 403 are optional components. Only the processor 404 and the decoding algorithm 405 are actually needed to decode the message in the encoded signal picked up by the strain gauge 401. It should also be noted that the high-pass filter 403 could also be a low-pass or a band-pass filter, depending on the type of noise anticipated in a particular application. As well, the gain circuit 402 or the filter 403, or both, may be discrete components as shown, or they may be integrated functions within the processor 404 in some embodiments.

Alternatively, instead of changing the pressure applied to the downhole tool, the deformation on the downhole tool may also be created by adding tension or compression to the tool. For example, if the tool is between a packer and the surface, adding or removing weight to the production string would change the deformation seen by the tool body. This approach uses the tool body, which is designed to take load, as part of the sensing mechanism, rather than having a separate component on the tool be specifically designed for the sensor.

Referring again to FIG. 1, in still further embodiments the digital command may be used to open the toe sleeve, which is the fracturing sleeve 15 located adjacent to the most distal end of the wellbore (i.e., the toe). Opening the toe sleeve allows fluid communication between the inner diameter ("ID") and outer diameter ("OD") of the tubular 13. The toe sleeve may be opened by moving a sleeve 19 from a first position that restricts fluid flow to a second position that allows fluid flow. Fluid may be subsequently pumped from the tubular 13 out into the formation 5.

In another embodiment, the motive energy used to move the sleeve 19 is a hydrostatic air chamber. The sleeve is moved in response to a signal from a processor, such as processor 404 shown in FIG. 4. The signal from the processor may be used to activate an electronic rupture disc, which allows hydraulic pressure to move the sleeve. In still other embodiments, the motive energy moving the sleeve is an electromechanical actuator, such as a hydraulic pump or an electric motor.

As discussed previously, those skilled in the art will understand that the strain gauge may be affixed to the mandrel (or other pressure housing) in different ways, such as through the use of an adhesive compound or by welding it to the mandrel directly.

Further, it will be understood that various strain sensors may be suitable used in embodiments of the invention, for example, the strain sensor may be a foil strain gauge, a piezo resistor, a vibrating wire, or a semiconductor gauge, or the strain sensor may measure the relative deformation of the mandrel to the housing with a capacitive deformation gauge.

Figure 5:
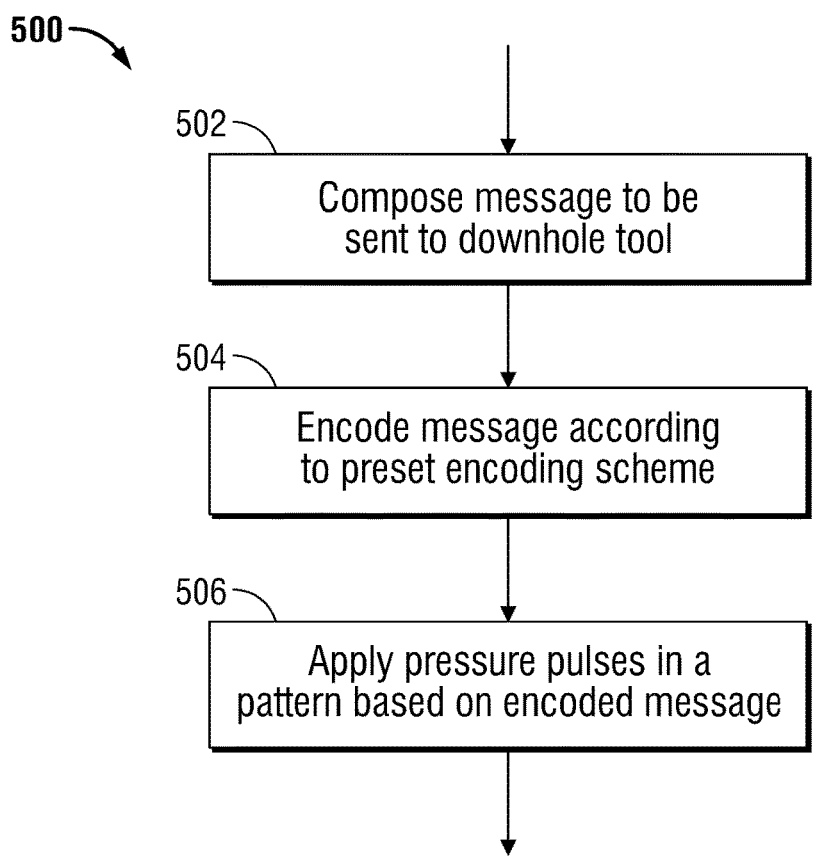
FIG. 5 is a flow diagram for a method of communicating with a downhole tool using mechanical strain according to embodiments of the disclosure.

Referring next to FIG. 5, a flow diagram is shown for a method 500 of using mechanical deformations to communicate a message to a downhole tool, such as fracturing sleeve, according to embodiments of the present disclosure. The method 500 generally begins at 502, where the specific message to be sent is composed, selected, or otherwise defined. For example, the message may be a command to the downhole tool to perform some operation or set of operations, or the message may simply be an actuation signal, such as an On/Off signal or a Start/Stop signal. The message be composed, selected, or defined either manually by an operator in some embodiments or automatically by the control equipment 20 (which may be manually operated).

At 504, the message is encoded according to a preset encoding scheme. The encoding can be done by the control equipment 20 as needed, but may also be done ahead of time and stored in (or downloaded to) the control equipment 20. Any encoding scheme known to those skilled in the art, including any of the encoding schemes discussed herein, may be used to encode the message. For example, a "0" or "Stop" may be encoded as a single deformation occurring on the downhole tool within a given time interval and a "1" or "Start" may be encoded as two (or more) deformations occurring within the time interval, and so forth.

At 506, the message is sent to the downhole tool by applying or generating a pattern of fluid pressure differentials or pulses that correspond to the encoded message. Each pressure pulse is expected to produce one deformation on the downhole tool, such that a "0" may be sent by generating one pressure pulse within a given time interval and a "1" may be sent by generating two pressure pulses within the time interval, and so forth. The pressure pulses may be generated by the pump P under the control of the control equipment 20 (and telemetry app 30) in some embodiments.

Figure 6:
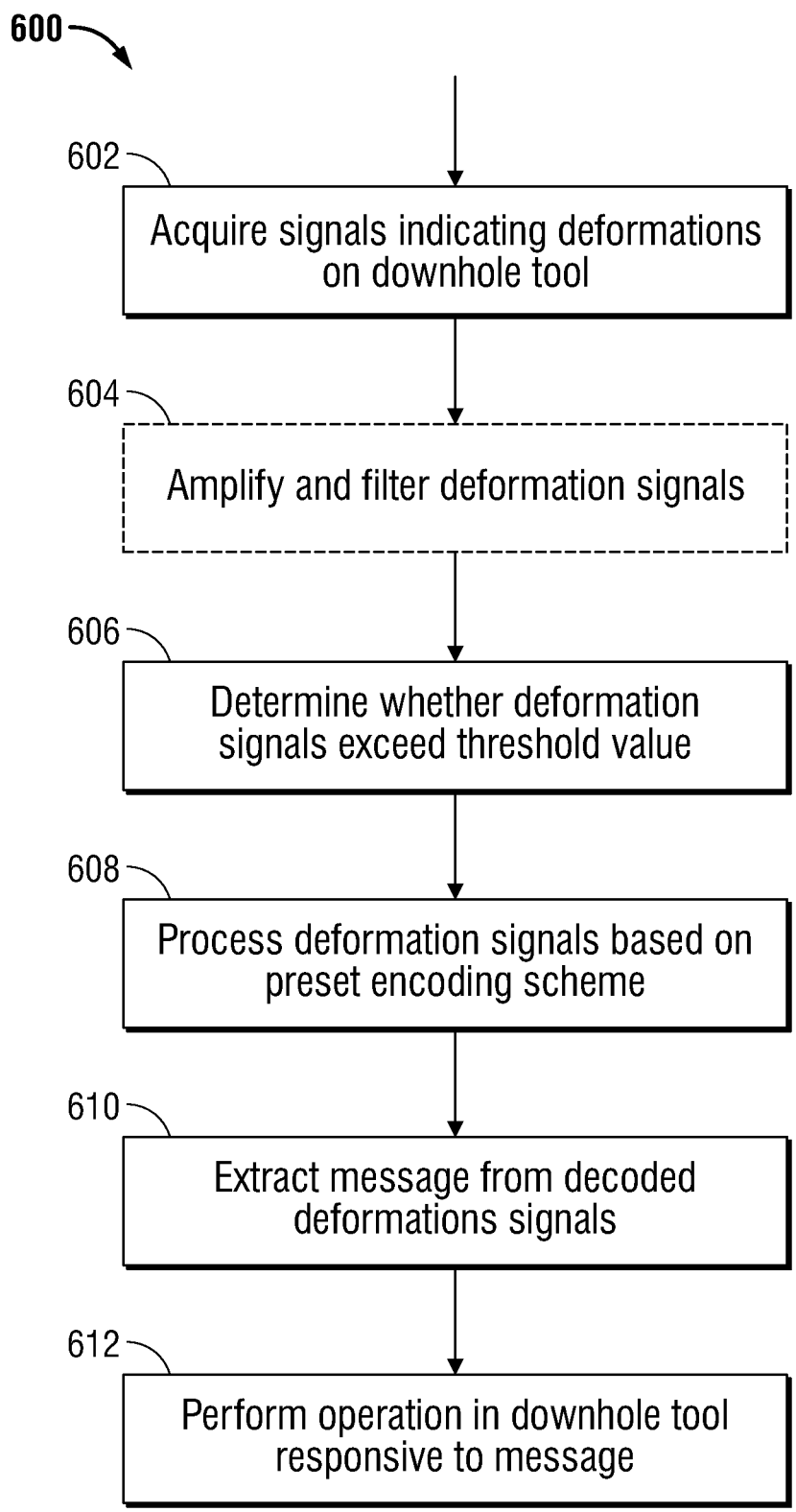
FIG. 6 is a flow diagram for a method of receiving communication in a downhole tool using mechanical strain according to embodiments of the disclosure.

FIG. 6 is a flow diagram for a method 600 of receiving a message in a downhole tool, such as fracturing sleeve, using mechanical deformations according to embodiments of the disclosure. The method 600 generally begins at 602, where signals indicating mechanical deformations (or lack thereof) on the downhole tool are acquired. The signals may be generated by a strain sensor, such as a strain gauge, and may be acquired by the downhole tool via a strain sensor circuit on a regular basis. For example, samples of the output from the strain sensor may be obtained at a given sampling frequency. Optionally, at 604, the signals from the strain sensor may be amplified and filtered (e.g., by a high-pass filter circuit) to improve the signal-to-noise ratio of the signals.

At 606, a determination is made regarding whether the deformation signals exceed a threshold value in accordance with the preset encoding scheme. The determination may be performed by the strain sensor circuit using the threshold value corresponding to the encoding scheme used. For example, depending on the encoding scheme used, the threshold value may be a fixed strain value, an adjusted strain value, a certain number of deformation cycles, and so forth, as discussed above.

At 608, the deformation signals are processed based on the encoding scheme used. As mentioned above, depending on the encoding scheme, the deformation signals may be processed as a "0" if a single deformation was detected within a given time interval, and as a "1" if two (or more) deformations were detected within the time interval, and so forth. The threshold value for recognizing and interpreting deformations may be set according to the particular encoding scheme used.

At 610, a message is extracted from the processed deformation signals. Such a message may be, for example, a command to the downhole tool to perform some operation or set of operations, or the message may simply be an actuation signal, such as an On/Off signal or a Start/Stop signal. At 612, a predefined operation is performed in the downhole tool in response to the extracted message.

Accordingly, as set forth above, embodiments of the present disclosure may be implemented in a number of ways. In general, in one aspect, embodiments of the present disclosure relate to a method of wireless communication with a downhole tool in an oil and gas well. The method comprises, among other things, applying fluid pressure differentials to a downhole tubular in a predefined pattern, the predefined pattern representing a digital signal according to a preset encoding scheme, the fluid pressure differentials causing mechanical deformations on the downhole tubular according to the predefined pattern. The method further comprises sensing the mechanical deformations on the downhole tubular caused by the fluid pressure differentials, and decoding the digital signal from the mechanical deformations according to the preset encoding scheme. A predefined action is caused to be performed by the downhole tool responsive to the digital signal.

In accordance with any one or more of the foregoing embodiments, decoding the digital signal comprises comparing the mechanical deformations against a threshold value in the preset encoding scheme, assigning a first digital value to mechanical deformations that exceed the threshold value, and assigning a second digital value to mechanical deformations that do not exceed the threshold value.

In accordance with any one or more of the foregoing embodiments, the threshold value represents one of a fixed deformation value added to a time-averaged deformation value, a threshold number of deformation cycles, or a threshold deformation duration, and the fixed threshold value is a function of noise in sensing the mechanical deformations.

In accordance with any one or more of the foregoing embodiments, a count is kept of how many times the mechanical deformations exceed the threshold value, and the count is reset if the mechanical deformations continuously exceed the threshold value for a predetermined length of time. In accordance with any one or more of the foregoing embodiments, the predefined action is performed by the downhole tool responsive to a number of times the mechanical deformations exceed the threshold value.

In general, in another aspect, embodiments of the present disclosure relate to a system for wireless communication with a downhole tool in an oil and gas well. The system comprises, among other things, a pump, a downhole tool in fluid communication with the pump, and control equipment connected to the pump. The control equipment is operable to control the pump to apply fluid pressure differentials to the downhole tool in a predefined pattern, the predefined pattern representing a digital signal according to a preset encoding scheme, the fluid pressure differentials causing mechanical deformations on the downhole tool according to the predefined pattern. The downhole tool includes a strain sensor circuit operable to sense the mechanical deformations on the downhole tool caused by the fluid pressure differentials and decode the digital signal from the mechanical deformations, wherein the downhole tool performs a predefined action responsive to the digital signal.

In accordance with any one or more of the foregoing embodiments, the strain sensor circuit decodes the digital signal by comparing the mechanical deformations against a threshold value in the preset encoding scheme, assigning a first digital value to mechanical deformations that exceed the threshold value, and assigning a second digital value to mechanical deformations that do not exceed the threshold value.

In accordance with any one or more of the foregoing embodiments, the threshold value represents one of a fixed deformation value added to a time-averaged deformation value, a threshold number of deformation cycles, or a threshold deformation duration, and/or the fixed threshold value is a function of noise in the mechanical deformations measured by the strain sensor circuit.

In accordance with any one or more of the foregoing embodiments, the strain sensor circuit is further operable to keep a count of how many times the mechanical deformations exceed the threshold value and reset the count if the mechanical deformations continuously exceed the threshold value for a predetermined length of time.

In accordance with any one or more of the foregoing embodiments, the downhole tool performs the predefined action responsive to a number of times the mechanical deformations exceed the threshold value. In accordance with any one or more of the foregoing embodiments, the downhole tool is a fracturing sleeve and the digital signal causes the fracturing sleeve to actuate a component therein.

In general, in yet another aspect, embodiments of the present disclosure relate to a downhole tool in an oil and gas well. The downhole tool comprises, among other things, a tool body and a strain sensor mounted on the tool body and configured to sense mechanical deformations in a portion of the tool body, the mechanical deformations resulting from applied fluid pressure on the downhole tool. The downhole tool further comprises a processor mounted on the tool body and electrically coupled to receive deformation signals from the strain sensor, the processor operable to convert the deformation signals into a digital signal. The digital signal initiates a predefined operation in the downhole tool.

In accordance with any one or more of the foregoing embodiments, the processor is operable to convert the deformation signals into the digital signal by comparing the deformation signals against a threshold value, the processor further operable to assign a first digital value to deformation signals that exceed the threshold value and assign a second digital value to deformation signals that do not exceed the threshold value.

In accordance with any one or more of the foregoing embodiments, the the threshold value represents one of a fixed deformation value added to a time-averaged deformation value, a threshold number of deformation cycles, or a threshold deformation duration, and/or the fixed threshold value is a function of noise in the deformation signals.

In accordance with any one or more of the foregoing embodiments, the applied fluid pressure on the downhole tool is applied in a predefined pattern that represents the digital signal.

In accordance with any one or more of the foregoing embodiments, the the strain sensor is a first strain sensor, wherein the downhole tool further comprises a second strain sensor mounted on the downhole tool orthogonal to the first strain sensor, the second strain sensor configured to measure mechanical deformations in a portion of the downhole tool.

In accordance with any one or more of the foregoing embodiments, the downhole tool further comprises one or more of: a high-pass filter electrically coupled between the strain sensor and the processor, and a gain circuit electrically coupled between the strain sensor and the processor.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A method of wireless communication with a downhole tool in an oil and gas well, comprising:
   applying fluid pressure differentials to a downhole tubular in a predefined pattern, the predefined pattern representing a digital signal according to a preset encoding scheme, the fluid pressure differentials causing mechanical deformations on the downhole tubular according to the predefined pattern;
   sensing the mechanical deformations on the downhole tubular caused by the fluid pressure differentials, wherein the sensing is performed by a first strain sensor and a second strain sensor mounted on the downhole tool orthogonal to the first strain sensor;
   decoding the digital signal from the mechanical deformations according to the preset encoding scheme, wherein decoding the digital signal comprises comparing the mechanical deformations against an amplitude threshold value in the preset encoding scheme, assigning a first digital value to mechanical deformations that exceed the amplitude threshold value, and assigning a second digital value to mechanical deformations that do not exceed the amplitude threshold value; and
   causing a predefined action to be performed by the downhole tool responsive to the decoded digital signal.

2. The method of claim 1, wherein the amplitude threshold value represents one of: a fixed deformation value added to a time-averaged deformation value; a threshold number of deformation cycles; or a threshold deformation duration.

3. The method of claim 2, wherein the fixed deformation value is a function of noise in sensing the mechanical deformations.

4. The method of claim 1, further comprising keeping a count of how many times the mechanical deformations exceed the amplitude threshold value and resetting the count if the mechanical deformations continuously exceed the amplitude threshold value for a predetermined length of time.

5. The method of claim 1, wherein the predefined action is performed by the downhole tool responsive to a number of times the mechanical deformations exceed the amplitude threshold value.

6. A system for wireless communication with a downhole tool in an oil and gas well, comprising:

a pump;

the downhole tool in fluid communication with the pump; and control equipment connected to the pump and operable to control the pump to apply fluid pressure differentials to the downhole tool in a predefined pattern, the predefined pattern representing a digital signal according to a preset encoding scheme, the fluid pressure differentials causing mechanical deformations on the downhole tool according to the predefined pattern;

wherein the downhole tool includes a first strain sensor circuit and a second strain sensor circuit, wherein the second strain sensor circuit is mounted on the downhole tool orthogonal to the first strain sensor circuit, where the first strain sensor circuit and the second strain sensor circuit are operable to sense the mechanical deformations on the downhole tool caused by the fluid pressure differentials and decode the digital signal from the mechanical deformations, wherein the strain sensor circuit is positionable to decode the digital signal by comparing the mechanical deformations against an amplitude threshold value in the preset encoding scheme, assigning a first digital value to mechanical deformations that exceed the amplitude threshold value, and assigning a second digital value to mechanical deformations that do not exceed the amplitude threshold value; and wherein the downhole tool performs a predefined action responsive to the decoded digital signal.

7. The system of claim 6, wherein the amplitude threshold value represents one of: a fixed deformation value added to a time-averaged deformation value; a threshold number of deformation cycles; or a threshold deformation duration.

8. The system of claim 7, wherein the fixed deformation value is a function of noise in the mechanical deformations measured by the strain sensor circuit.

9. The system of claim 6, wherein the strain sensor circuit is further operable to keep a count of how many times the mechanical deformations exceed the amplitude threshold value and reset the count if the mechanical deformations continuously exceed the amplitude threshold value for a predetermined length of time.

10. The system of claim 6, wherein the downhole tool performs the predefined action responsive to a number of times the mechanical deformations exceed the amplitude threshold value.

11. The system of claim 6, wherein the downhole tool is a fracturing sleeve and the digital signal causes the fracturing sleeve to actuate a component therein.

12. A downhole tool in an oil and gas well, comprising:
a tool body;
a first strain sensor and a second strain sensor mounted on the tool body, wherein the second strain sensor is mounted orthogonal to the first strain sensor, wherein the first strain sensor and the second strain sensor are configured to sense mechanical deformations in a portion of the tool body, the mechanical deformations resulting from applied fluid pressure on the downhole tool; and
a processor mounted on the tool body and electrically coupled to receive deformation signals from the strain sensor, the processor operable to convert the deformation signals into a digital signal by comparing the deformation signals against an amplitude threshold value and assigning a first digital value to deformation signals that exceed the amplitude threshold value and a second digital value to deformation signals that do not exceed the amplitude threshold value; and
wherein the digital signal initiates a predefined operation in the downhole tool.

13. The downhole tool of claim 12, wherein the amplitude threshold value represents one of: a fixed deformation value added to a time-averaged deformation value; a threshold number of deformation cycles; or a threshold deformation duration.

14. The downhole tool of claim 13, wherein the fixed deformation value is a function of noise in the deformation signals.

15. The downhole tool of claim 12, wherein the applied fluid pressure on the downhole tool is applied in a predefined pattern that represents the digital signal.

16. The downhole tool of claim 12, further comprising one or more of: a high-pass filter electrically coupled between the strain sensor and the processor, and a gain circuit electrically coupled between the strain sensor and the processor.

* * * * *